(12) United States Patent
Bahn et al.

(10) Patent No.: US 9,563,566 B2
(45) Date of Patent: Feb. 7, 2017

(54) DEVICE AND METHOD FOR INTEGRATED DATA MANAGEMENT FOR NONVOLATILE BUFFER CACHE AND NONVOLATILE STORAGE

(71) Applicant: EWHA UNIVERSITY—INDUSTRY COLLABORATION FOUNDATION, Seoul (KR)

(72) Inventors: Hyokyung Bahn, Seoul (KR); Eunji Lee, Seoul (KR); Sam H Noh, Seoul (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 14/352,093

(22) PCT Filed: Feb. 28, 2014

(86) PCT No.: PCT/KR2014/001696
§ 371 (c)(1),
(2) Date: Apr. 16, 2014

(87) PCT Pub. No.: WO2014/208863
PCT Pub. Date: Dec. 31, 2014

(65) Prior Publication Data
US 2016/0098351 A1    Apr. 7, 2016

(30) Foreign Application Priority Data
Jun. 27, 2013  (KR) .................. 10-2013-0074464

(51) Int. Cl.
*G06F 12/0891* (2016.01)
*G06F 12/02* (2006.01)
(Continued)

(52) U.S. Cl.
CPC ......... *G06F 12/0891* (2013.01); *G06F 3/0619* (2013.01); *G06F 3/0656* (2013.01);
(Continued)

(58) Field of Classification Search
CPC .. G06F 12/0891; G06F 3/0619; G06F 3/0656; G06F 3/0688; G06F 12/0246; G06F 2212/1032; G06F 2212/222; G06F 2212/7206; G06F 2212/7209
See application file for complete search history.

(56) References Cited

U.S. PATENT DOCUMENTS

2014/0181434 A1* 6/2014 Chau ................. G06F 12/16
711/162

* cited by examiner

*Primary Examiner* — Eric S Cardwell
(74) *Attorney, Agent, or Firm* — Lex IP Meister, PLLC

(57) ABSTRACT

An integrated nonvolatile memory control subsystem and method are disclosed. The integrated nonvolatile memory control subsystem includes a nonvolatile buffer cache, a nonvolatile journal area, nonvolatile storage, and an integrated memory control unit. The integrated memory control unit performs a read operation, a write operation, a commit operation and a checkpoint operation on the cache blocks of the nonvolatile buffer cache and the journal blocks of the nonvolatile journal area. The integrated memory control unit sets each of data blocks of the nonvolatile storage as one among valid state, erasable state and invalid state, depending on being cached or not, being journaled or not, and being a clean cache or not, so as to maintain an authentic original up-to-date consistent data within any one of the nonvolatile buffer cache, the nonvolatile journal area and the nonvolatile storage.

20 Claims, 5 Drawing Sheets

(51) Int. Cl.
*G06F 3/06* (2006.01)
*G06F 12/08* (2016.01)
(52) U.S. Cl.
CPC ........ *G06F 3/0688* (2013.01); *G06F 12/0246* (2013.01); *G06F 2212/1032* (2013.01); *G06F 2212/222* (2013.01); *G06F 2212/7206* (2013.01); *G06F 2212/7209* (2013.01)

DEVICE AND METHOD FOR INTEGRATED DATA MANAGEMENT FOR NONVOLATILE BUFFER CACHE AND NONVOLATILE STORAGE

GOVERNMENT SPONSORSHIP STATEMENT

This work was supported by the IT R&D program MKE/KEIT of Korea (No. 1415122825, Embedded System Software for Newmemory based Smart Devices).

BACKGROUND OF THE INVENTION

1. Field of the Invention

The present invention relates generally to a storage data management technique and, more particularly, to, a technique for managing data in storage implemented with nonvolatile memory devices.

2. Description of the Related Art

Recently, as technology for nonvolatile memory (NVRAM), such as phase change memory (PCM) and spin torque transfer magnetic RAM (STT-MRAM) have been rapidly developed, it is expected that NVRAM will be used as main memory, replacing dynamic RAM (DRAM) in the near future. In some cases, NVRAM may exhibit better characteristics than DRAM in various aspects, such as performance, the level of integration, power consumption, etc.

The advent of nonvolatile main memory is expected to significantly affect the conventional hierarchy storage management mechanisms equipped with volatile main memory. Furthermore, it is expected that a system with a main memory, a buffer cache and a storage implemented with nonvolatile memory will be introduced in the near future.

Since a buffer cache in a conventional system is provided by RAM, which is a volatile medium, the buffer cache is used to temporarily store data for instant access to the data. In contrast, if a buffer cache is implemented with a nonvolatile medium, the buffer cache, though being conventionally a temporary storage, can semi-permanently store data, like a mass storage, which is a semi-permanent data storage.

Meanwhile, a flash memory incessantly performs write operations by itself, for example without data updates, due to supplementary management tasks, such as garbage collection (GC), unique to a nonvolatile storage device, while a hard disk drive may store data, once having been written, at the same location semi-permanently unless an exceptional situation.

In a nonvolatile mass storage device in which a write operation is relatively slow, its performance and lifespan are reduced because of overhead, such as a management task, and thus it requires high cost to maintain data.

Accordingly, in this context, there is a need for a storage management technique capable of managing a buffer cache and a mass storage in an integrated manner and increasing their performance and lifespan in an environment where nonvolatile storage media are used as the buffer cache and the mass storage.

Meanwhile, a conventional method for dealing with a system failure of a file system is a method for conducting an integrity check of a file system in the case of, for example, Linux, using a predetermined utility, such as fsck, upon booting, during which the file system is examined, and if an error is found, the error is automatically fixed by the utility, or the system will be reboot in recovery mode so that a user can manually recover the system.

Depending on the version of an OS, a utility, such as fsck, may be always run upon mounting, in order to check the consistency of the metadata of a file system. Accordingly, in the case of the conventional method, a file system must be always inspected because it is unlikely to know when problems will occur in the file system, and further the massive file system must be sequentially investigated because it is unlikely to know where problems will be found.

A journaling technique, having been proposed to overcome the above disadvantages, is a technique that records changes in a journal before recording them in a file system and manages metadata about the changes as a log. The journaling technique can recover a file system with high reliability and speed in case of an abnormal termination of the file system, and improves disk performance utilizing a relatively faster journal, instead of a slower disk, during normal operations.

The metadata of a file system is secondary data for structure management that is used to manage data stored in a disk in a structural manner. The metadata of a file system is created for creating or deleting a file, making or erasing a directory, increasing or decreasing the size of a file, or the like. In other words, the metadata of a file system is information about changes to be reflected in the file system.

A file system employing a journaling technique is referred to as a journaling file system. Journaling file systems are commonly designed to record changes or both of changes and their metadata in a dedicated journal area and to record up-to-date changes upon the location of an authentic original version in storage at a predetermined point in time, which is referred to as a checkpoint operation.

For a write operation in the journal area, the file system manages a series of updates, which must be consistently reflected on a transaction basis, and performs a commit operation for guaranteeing that all data belonging to a transaction are to be successfully recorded in the journal area, normally in a cycle of a few minutes.

Journaling file systems have been developed to have somewhat different detailed policies depending on their developers. For example, depending on the policies, changes may be stored at the location of an authentic original version in storage and then their metadata may be recorded in a journal area, or both of metadata and changes may be recorded in a journal and then the changes may be again recorded at the location of an authentic original version in storage. Furthermore, depending on the policies, a journal may be checkpointed when the remaining space turns out to be insufficient, or a journal may be checkpointed when a predetermined time comes.

The journal area of a journaling file system may be implemented as a partial space of nonvolatile storage because the stored journal must be maintained when and after a system failure occurs.

While a system having no journaling feature transfers updated data from main memory to a storage device to be recorded at the very moment when replacement must be performed because of insufficient space in a cache, a system with journaling feature frequently generates a commit operation in a cycle of a few minutes even in order to reduce the vulnerability of a system, causing considerable storage traffic. As a result, a significant reduction in performance may occur in a hard disk and a cloud storage demanding expensive access cost, and also considerable reductions in performance and durability may occur in a flash memory based environment in which limited numbers of write operations at low speed are allowed.

Although there is a consensus that cloud storage systems, recently attracting attention, may require journaling file systems, a journaling file system is not easily applied to cloud storage systems because the network access cost increases due to journaling.

Meanwhile, although the above problem seems to be easily overcome by just constructing a nonvolatile buffer cache and a nonvolatile memory capable of random access in read and write operations, such as PCM or STT-MRAM, as main memory, this is not true in practice.

In journaling file systems, reliability can be achieved not only by maintaining data when power turns off, but also by guaranteeing the consistency of data during power failure followed by reconnecting to power and rebooting.

For example, a change to data in a buffer cache and a change to corresponding metadata must happen concurrently. If a system crashes just after data has been updated in a nonvolatile buffer cache, the metadata is not consistent with up-to-date changed data even when the up-to-date changed data remains in the nonvolatile buffer cache after rebooting has been performed. Accordingly, if the changed data is reflected at the location of an authentic original version in storage, the consistency of a file system is corrupted.

SUMMARY OF THE INVENTION

In accordance with an aspect of the present invention, there is provided an integrated nonvolatile memory control subsystem, including a nonvolatile buffer cache configured to maintain one or more cache blocks, a nonvolatile journal area configured to maintain one or more journal blocks, nonvolatile storage configured to maintain one or more data blocks and an integrated memory control unit for performing a read operation, a write operation, a commit operation and a checkpoint operation on the cache blocks of the nonvolatile buffer cache and the journal blocks of the nonvolatile journal area, wherein the integrated memory control unit sets each of data blocks of the nonvolatile storage as one among valid state, erasable state and invalid state, depending on being cached or not, being journaled or not, and being a clean cache or not, considers data stored in a data block of the nonvolatile storage to be authentic original if the data block is of valid state or erasable state, and considers data stored in any one of cache block and journal block to be authentic original if a corresponding data block of the nonvolatile storage is of invalid state, so as to maintain an authentic original up-to-date consistent data within any one of the nonvolatile buffer cache, the nonvolatile journal area and the nonvolatile storage.

The integrated memory control unit may be operative to set a data block as valid state, the data block being corresponding to data previously being cached from the nonvolatile storage to the nonvolatile buffer cache and then being evicted from the nonvolatile buffer cache, a data block being not yet cached, and a data block of the nonvolatile storage corresponding to a dirty up-to-date cache block not yet committed to the nonvolatile journal area after being cached.

The integrated memory control unit may be operative to set a corresponding data block of the nonvolatile storage as invalid state and to consider data stored in a journal block of the nonvolatile journal area in response to a commit operation to be authentic original, if a dirty up-to-date cache block not yet committed to the nonvolatile journal area is committed to the nonvolatile journal area by the commit operation.

The integrated memory control unit may be operative to set, a cache block satisfying conditions as a clean up-to-date cache block, the conditions including a condition in which a corresponding data block of the nonvolatile storage has been cached in the nonvolatile buffer cache in response to read access, or a condition in which up-to-date data is stored in a corresponding data block of the nonvolatile storage in response to a checkpoint operation performed on a dirty up-to-date cache block in the nonvolatile buffer cache, and to set a data block of the nonvolatile storage corresponding to a clean up-to-date cache block of the nonvolatile buffer cache as erasable state.

The integrated memory control unit may be operative to receive a report related to monitoring whether a data block set as erasable state in the nonvolatile storage is actually erased or a report on erasing a data block of erasable state from the nonvolatile storage.

The integrated memory control unit may be operative to set a clean up-to-date cache block being cached in the nonvolatile buffer cache corresponding as an erased data block, as a frozen dirty up-to-date cache block, if the erased data block is a data block, having been set as erasable state and having been considered to be authentic original in the nonvolatile storage, before being actually erased, and to consider data stored in the frozen dirty up-to-date cache block in the nonvolatile buffer cache to be authentic original until a subsequent commit or checkpoint operation is performed.

The integrated memory control unit may be operative to release a frozen dirty up-to-date cache block from its frozen state in the nonvolatile buffer cache and thus change the frozen dirty up-to-date cache block to a dirty up-to-date cache block if the frozen dirty up-to-date cache block in the nonvolatile buffer cache is committed to the nonvolatile journal area in response to a commit operation; and to consider data stored in an journal block of the nonvolatile journal area according to the commit operation to be authentic original.

The integrated memory control unit may be operative to, upon performing a checkpoint operation, store data, which was stored in a journal block of the nonvolatile journal area and considered to be authentic original, in a data block of the nonvolatile storage and to set the data stored in the nonvolatile storage as erasable state.

The integrated memory control unit may be operative to, as for write access to a frozen dirty up-to-date cache block of the nonvolatile buffer cache, write data related to the write access into an empty cache block, to set the frozen dirty up-to-date cache block as a frozen dirty out-of-date cache block and to consider the data stored in the frozen dirty out-of-date cache block of the nonvolatile buffer cache to be authentic original until a subsequent commit or checkpoint operation is performed.

The integrated memory control unit may be operative to clear the frozen dirty out-of-date cache block or a frozen dirty obsolete cache block, which has been turned into from the frozen dirty out-of-date cache block in response to a commit operation, as an empty cache block.

In accordance with another aspect of the present invention, there is provided an information processing apparatus, including a processor; and an integrated nonvolatile memory control subsystem, wherein the integrated nonvolatile memory control subsystem includes a nonvolatile buffer cache configured to maintain one or more cache blocks; a nonvolatile journal area configured to maintain one or more journal blocks; nonvolatile storage configured to maintain one or more data blocks; and an integrated memory control unit for performing a read operation, a write operation, a commit operation and a checkpoint operation on the cache blocks of the nonvolatile buffer cache and the journal blocks of the nonvolatile journal area, wherein the integrated memory control unit sets each of data blocks of the nonvolatile storage as one among valid state, erasable state and invalid state, depending on being cached or not, being journaled or not, and being a clean cache or not, considers data stored in a data block of the nonvolatile storage to be authentic original if the data block is of valid state or erasable state, and considers data stored in any one of cache block and journal block to be authentic original if a corresponding data block of the nonvolatile storage is of invalid state, so as to maintain an authentic original up-to-date consistent data within any one of the nonvolatile buffer cache, the nonvolatile journal area and the nonvolatile storage.

In accordance with still another aspect of the present invention, there is provided an integrated nonvolatile memory control method for a host managing a nonvolatile buffer cache configured to maintain one or more cache blocks, a nonvolatile journal area configured to maintain one or more journal blocks, and nonvolatile storage configured to maintain one or more data blocks in an integrated manner, the method comprising: by the host, setting, as valid state, a data block corresponding to data being cached from the nonvolatile storage to the nonvolatile buffer cache and then being evicted for emptying the cache block, or a data block being not yet cached; setting a corresponding data block in the nonvolatile storage as valid state if a cache block cached in the nonvolatile buffer cache is a dirty up-to-date cache block, not yet committed to the nonvolatile journal area; setting a corresponding data block in the nonvolatile storage as invalid state if a cache block having been cached but not yet been committed to the nonvolatile buffer cache was committed to the nonvolatile journal area; setting a corresponding data block in the nonvolatile storage as erasable state if a cache block cached in the nonvolatile buffer cache is a clean up-to-date cache block; and setting, if a data block set as erasable state was actually erased, a clean up-to-date cache block corresponding to the erased data block as a frozen dirty up-to-date cache block and setting the erased data block in the nonvolatile storage as nominal invalid state.

According to the embodiment of the invention, if a dirty up-to-date cache block not yet committed to the nonvolatile journal area was committed to the nonvolatile journal area by a commit operation, the data stored in a journal block of the nonvolatile journal area in response to the commit operation is considered to be authentic original.

According to the embodiment of the invention, a cache block satisfying conditions is set as a clean up-to-date cache block, wherein the conditions including a condition in which a corresponding data block of the nonvolatile storage has been cached in the nonvolatile buffer cache in response to read access, or a condition in which up-to-date data is stored in a corresponding data block of the nonvolatile storage in response to a checkpoint operation performed on a dirty up-to-date cache block in the nonvolatile buffer cache.

The integrated nonvolatile memory control method may further include receiving a report related to monitoring whether a data block set as erasable state in the nonvolatile storage is actually erased, or a report on erasing a data block of erasable state from the nonvolatile storage.

According to the embodiment of the invention, data stored in the frozen dirty up-to-date cache block in the nonvolatile buffer cache is considered to be authentic original until a subsequent commit or checkpoint operation is performed.

The integrated nonvolatile memory control method may further include releasing a frozen dirty up-to-date cache block from its frozen state in the nonvolatile buffer cache and thus change the frozen dirty up-to-date cache block to a dirty up-to-date cache block if the frozen dirty up-to-date cache block in the nonvolatile buffer cache is committed to the nonvolatile journal area in response to a commit operation, wherein the data stored in an journal block of the nonvolatile journal area according to the commit operation is considered to be authentic original.

According to the embodiment of the invention, upon performing a checkpoint operation, data, which was stored in a journal block of the nonvolatile journal area and considered to be authentic original, is stored in a data block of the nonvolatile storage and the data stored in the nonvolatile storage is set as erasable state.

The integrated nonvolatile memory control method may further include: as for write access to a frozen dirty up-to-date cache block of the nonvolatile buffer cache, writing data related to the write access into an empty cache block; and setting the frozen dirty up-to-date cache block as a frozen dirty out-of-date cache block, wherein the data stored in the frozen dirty out-of-date cache block of the nonvolatile buffer cache is considered to be authentic original until a subsequent commit or checkpoint operation is performed.

The integrated nonvolatile memory control method may further include clearing the frozen dirty out-of-date cache block or a frozen dirty obsolete cache block, which has been turned into from the frozen dirty out-of-date cache block in response to a commit operation, into an empty cache block.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
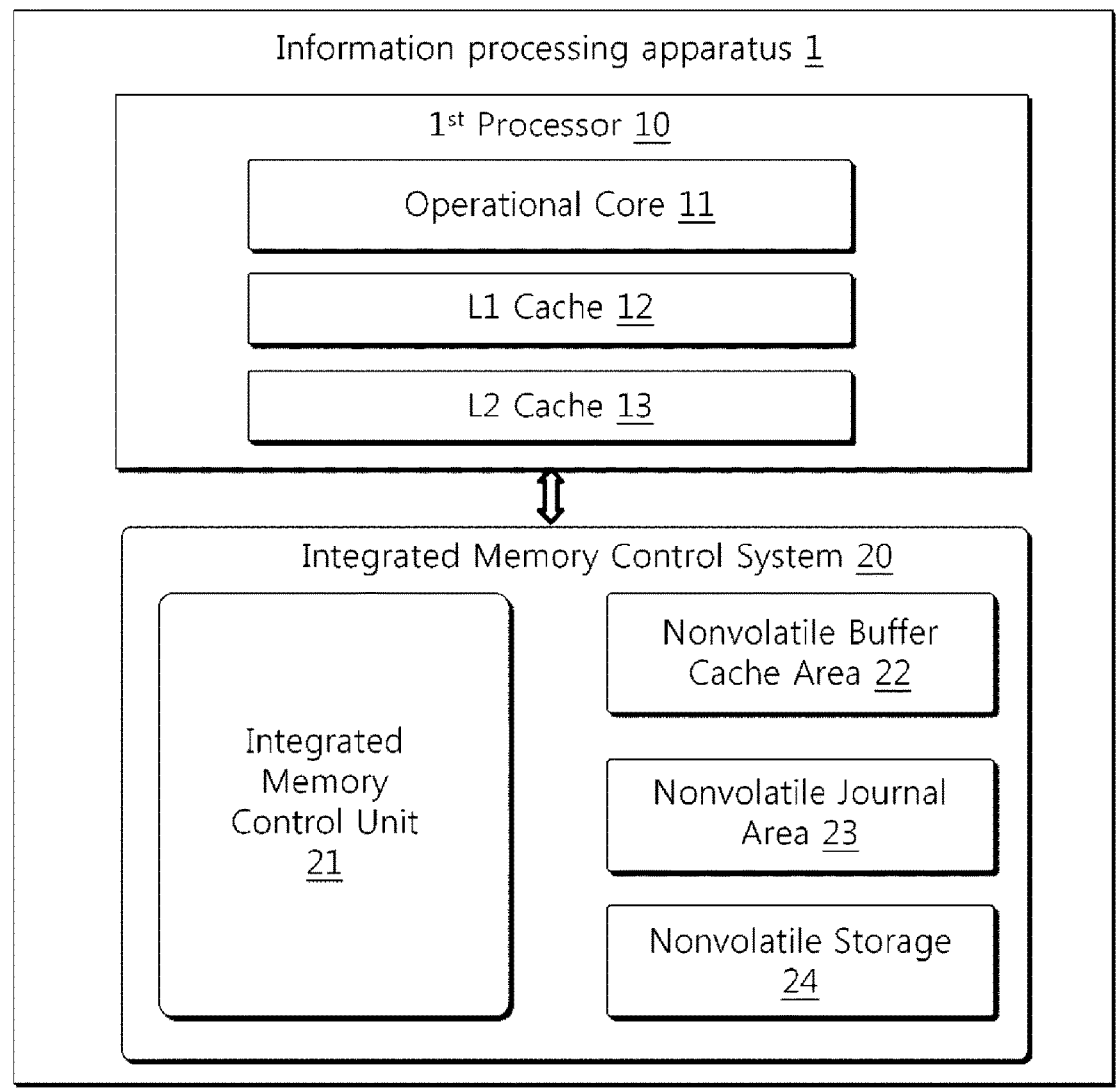
FIG. 1 is a block diagram illustrating an information processing apparatus including a device for integrated data management for a nonvolatile buffer cache and a nonvolatile storage according to an embodiment of the present invention.

With regard to embodiments of the present invention set forth herein, specific structural and functional descriptions are given merely for the purpose of description of the embodiments of the present invention. The present invention may be practiced in various forms, and should not be construed as being limited to embodiments set forth herein.

Embodiments of the present invention are described in detail below with reference to the accompanying drawings. The same reference numerals are used to designate the same or similar components throughout the drawings, and redundant descriptions of the same components are omitted.

In the following description, unless otherwise defined locally, with respect to data referred to by the same address, the term "data block" refers to a block in a storage whose corresponding data has been stored, the term "cache block" refers to a block in a buffer cache where the data has been cached, and the term "journal block" refers to a block in a journal area where the data has been journaled.

In general, by a commit operation, an up-to-date consistent version of data is confirmatively stored from a buffer cache to a journal area. Such an operation may be referred to as "a commit operation" or simply "commit" from the perspective of the buffer cache that performs a commit operation, or "a journaling operation" or simply "journaling" regarding to the journal area. Accordingly, throughout the specification and the claims, the terms "committed" and "journaled" are interchangeable with one another in the above context.

The term "erasable state" used herein refers to a state where a data block of nonvolatile storage has valid data and may also be subjected to the garbage collection of a nonvolatile storage device. If a data block has invalid data, the data block may be subjected to garbage collection.

The term "authentic original" used herein refers to a version being able to guarantee consistency and also being the most up-to-date for a normal re-startup in case of a system failure.

FIG. 1 is a block diagram illustrating an information processing apparatus 1 including a device for integrated data management for a nonvolatile buffer cache and a nonvolatile storage according to an embodiment of the present invention.

Referring to FIG. 1, the information processing apparatus 1 according to this embodiment of the present invention may include a processor 10 and an integrated nonvolatile memory control subsystem 20.

The processor 10 may internally include an operational core 11 and caches of various levels, for example, an L1 cache 12 and an L2 cache 13.

The integrated nonvolatile memory control subsystem 20 may include an integrative memory control unit 21, a nonvolatile buffer cache 22, a nonvolatile journal area 23, and a nonvolatile storage 24.

The integrated memory control unit 21 may be implemented as hardware, or may be implemented as a combination of hardware, such as a memory controller device, and software, such as an OS or a driver.

The nonvolatile buffer cache 22, the nonvolatile journal area 23 and the nonvolatile storage 24 may be implemented as logically separate areas in a single physical storage medium, or may be implemented as separate physical storage media, depending on their embodiment.

The integrated memory control unit 21 maintains and manages up-to-date consistent authentic data in any one of the nonvolatile buffer cache 22, the nonvolatile journal area 23 and the nonvolatile storage 24, and protects the up-to-date consistent authentic data from a system failure, thereby guaranteeing the respective consistency of the obsolete original data, the new authentic original data and the updated data stored in the nonvolatile buffer cache 22, the nonvolatile journal area 23, and the nonvolatile storage 24.

In general, a storage and a buffer cache operate in such a manner that, with the authentic original version of data being kept in the storage, a copied version or an updated version of the data is temporarily maintained in the buffer cache upon access, such as a read operation or a write operation, to the storage. If the data was changed and thus the copy of the data stored in the buffer cache was updated, the data will be evicted from the buffer cache, as the updated version of the data gets reflected in the storage.

In contrast, the integrated memory control unit 21 according to this embodiment of the present invention sets each of the data blocks of the nonvolatile storage 24 as one among valid, erasable and invalid states depending on whether being cached or not, being journaled or not, and being a clean cache or not, in other words, depending on whether getting a read access or not, getting a write access or not, having performed a commit operation or not, and having performed a checkpoint operation or not, and considers data stored in a data block of the nonvolatile storage 24 to be authentic original if the corresponding data block is set as valid state or erasable state, and considers data stored in any one of a corresponding cache block and a corresponding journal block to be authentic original if the data block is set as invalid state, thereby managing the read, write, commit and checkpoint operations of the nonvolatile buffer cache 22, the nonvolatile journal area 23 and the nonvolatile storage 24 in an integrated manner so as to maintain the authentic original of up-to-date consistent data in any one of the nonvolatile buffer cache 22, the nonvolatile journal area 23 and the nonvolatile storage 24.

Figure 2:
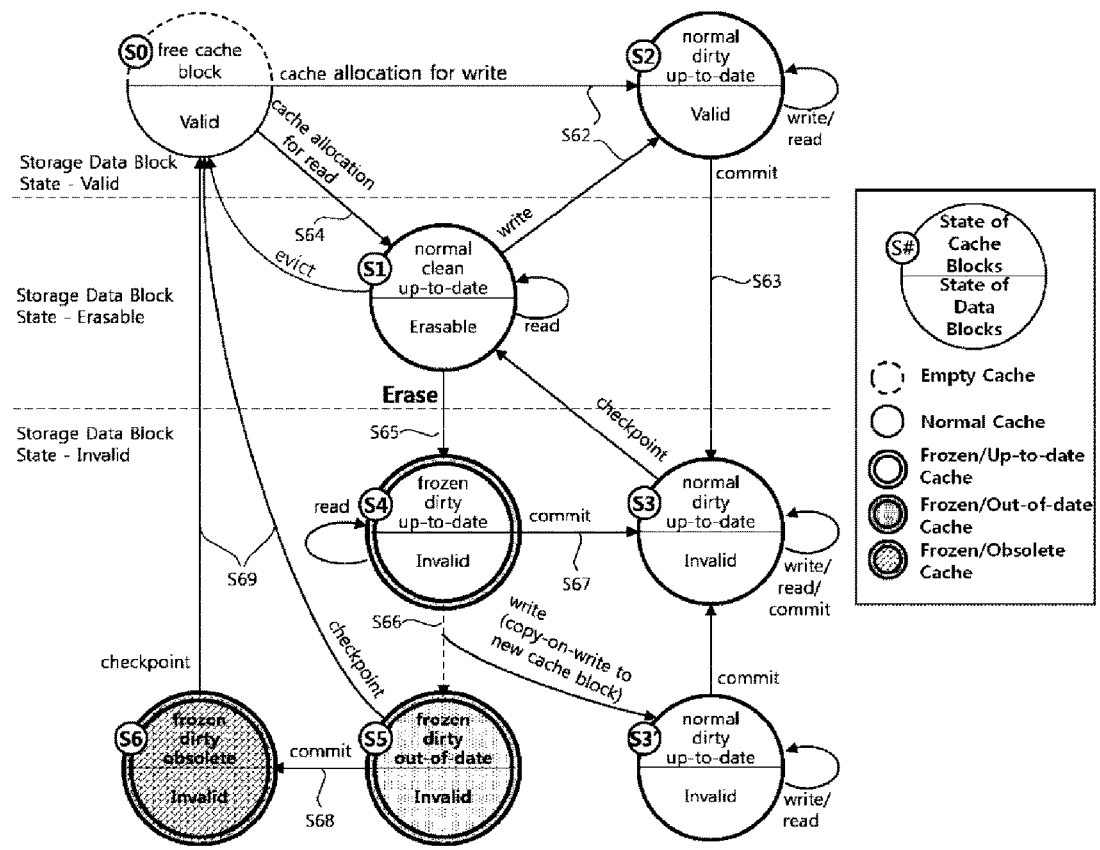
FIG. 2 is a state diagram illustrating the state changes of a buffer cache block in a method of integrated data management for a nonvolatile buffer cache and a nonvolatile storage according to an embodiment of the present invention.

More specifically, FIG. 2 is referred to for describing the operation of the integrated memory control unit 21, where FIG. 2 is a state diagram illustrating the state changes of a buffer cache block in a method of integrated data management for a nonvolatile buffer cache and a nonvolatile storage according to an embodiment of the present invention.

In FIG. 2, with regard to each of circles divided by respective lateral lines, the upper half thereof indicates the state of a cache block, the lower half thereof indicates the state of a data block, and a small circle on one side of the upper half indicates the index of these states.

The arrows represent control operations, such as read/write accesses, commit/checkpoint operations, erase detection, etc. Each of the arrows may be provided with illustrative relation with each of steps S61 to S69 of FIG. 6.

State 0 S0 is a state in which a data block has not been cached, and, more specifically, corresponds to one of: the case where data has not been yet cached in the nonvolatile buffer cache 22 because there has been no read access or write access to the data blocks of the nonvolatile storage 24, the case where a clean cache block of state 1 S1 once cached in response to previous read access has been cleared into an empty cache block, or the case where a checkpoint operation has been performed from the nonvolatile buffer cache 22 to the nonvolatile storage 24 and a corresponding cache block in the nonvolatile buffer cache 22 has been cleared into an empty cache block.

Data blocks of state 0 in the nonvolatile storage 24 are set as valid state, and data stored in the data blocks are considered to be authentic original.

State 1 S1 corresponds to a case where a cache block cached in the nonvolatile buffer cache 22 is a clean up-to-date cache block. The integrated memory control unit 21 sets a data block of state S1 in the nonvolatile storage 24 as erasable state.

More specifically, if a read access has been made to a data block of state 0 S0, which has not been cached, in the nonvolatile storage 24, or if up-to-date data is stored in an empty data block of the nonvolatile storage 24 as a result of a checkpoint operation being performed for data block of state 3 S3 where there exist a journal block committed to the nonvolatile journal area 23 and an up-to-date unfrozen dirty cache block in the nonvolatile buffer cache 22, the integrated memory control unit 21 sets the cache block of the nonvolatile buffer cache 22 as a clean up-to-date cache block and sets the data block of the nonvolatile storage 24 as erasable state 1 S1. If a clean up-to-date cache block is recovered as an empty cache block without any change after being cached, the integrated memory control unit 21 may switch the data block of the nonvolatile storage 24 in erasable state 1 S1 to valid state 0 S0.

In this case, the integrated memory control unit 21 considers data stored in a data block set as erasable state in the nonvolatile storage 24 to be authentic original, and caches the corresponding data block in a corresponding cache block in the nonvolatile buffer cache 22.

In this case, although the data block in erasable state 1 S1 in the nonvolatile storage 24 is under unstable state of being erased through garbage collection at any time, copied data identical to the data stored in the data block of state 1 S1 has been cached as a clean up-to-date cache block of the nonvolatile buffer cache 22, and thus consistency can be provided with even when the data block is erased.

However, in this case, a local controller of the nonvolatile storage 24 can erase the data block of erasable state at any time during performing garbage collection, so that there may be a need for an additional means enabling the higher-level integrated memory control unit 21 to monitor whether the data block of erasable state was actually erased or not during garbage collection or to receive a report of erasing the data block of erasable state from the local controller of the nonvolatile storage 24.

The integrated memory control unit 21, in response to read access to the data block of state 1 S1, directly performs a read operation on the cache block of the nonvolatile buffer cache 22 instead of the corresponding data block.

In contrast, as for a write access, the data block and the cache block of state 1 S1 change to state 2 S2.

Meanwhile, this configuration is reviewed from the point of view of garbage collection: conventional garbage collection may be considered as an operation for cleaning up blocks having invalid data, whereas garbage collection according to the present invention may be viewed as an operation for cleaning up blocks having valid data, together with blocks having invalid data, if a copied version identical to the valid data have been safely read-cached in the nonvolatile buffer cache.

State 2 S2 is a state after a write access has been made to a data block of state 0 S0 or state 1 S1 in the nonvolatile storage 24, until a commit is performed.

The integrated memory control unit 21 sets a corresponding data block of the nonvolatile storage 24 of state 2 S2 to valid state as long as the nonvolatile buffer cache 22 is set as a dirty up-to-date cache block that has not been committed yet.

Even when an update write is performed on a corresponding cache block in the nonvolatile buffer cache 22 in response to a further write access to a data block of state 2 S2 in the nonvolatile storage 24, the integrated memory control unit 21 may maintain corresponding data of the nonvolatile storage 24 in valid state before the corresponding cache block is committed.

In this case, the integrated memory control unit 21 considers the data stored in a data block being set as valid state in the nonvolatile storage 24 to be authentic original, and performs a read or write operation on a cache block of the nonvolatile buffer cache 22 instead of the corresponding data block, in response to a read access or write access, unless a commit operation is performed on the nonvolatile buffer cache 22.

Accordingly, the data block and cache block of state 2 S2 keep their states in state 2 upon read or write access.

In this status, if a system failure occurs at a time before a commit operation is performed, the data of an up-to-date version written to the nonvolatile buffer cache 22 is discarded, and the data of the valid data block of the nonvolatile storage 24 is applied as an authentic original when the system starts up again.

State 3 S3 corresponds to the case where a commit operation is performed on a dirty up-to-date cache block of state 2 S2 in the nonvolatile buffer cache 22 or the frozen dirty up-to-date cache block of state 4 S4 in the nonvolatile buffer cache 22. After the commit operation and until a checkpoint operation is performed, the corresponding data block of the nonvolatile storage 24 is set as invalid state.

In other words, if a committed journal block is present in the nonvolatile journal area 23 with respect to the dirty up-to-date cache block cached in the nonvolatile buffer cache 22, the integrated memory control unit 21 sets the corresponding data block of the nonvolatile storage 24 as invalid state before a checkpoint operation is performed.

More specifically, after a commit operation has been performed on the dirty up-to-date cache block (i.e., the cache block of state 2 S2) not yet committed to the nonvolatile journal area 23, the integrated memory control unit 21 commits the data of the dirty up-to-date cache block to a journal block of the nonvolatile journal area 23, switches the corresponding data block of the nonvolatile storage 24 to invalid state, and considers the data of the journal block committed to the nonvolatile journal area 23 to be authentic original, until a checkpoint operation is performed.

Until a checkpoint operation is performed, that is, during state 3 S3, the integrated memory control unit 21 performs a read or write operation on a cache block of the nonvolatile buffer cache 22 instead of the corresponding data block in response to read access or write access, and performs a commit operation in response to a commit trigger.

Once a checkpoint operation has been performed on the dirty up-to-date cache block of state 3 S3 in the nonvolatile buffer cache 22, the integrated memory control unit 21 may commit cached data to the nonvolatile journal area 23 and, at the same time, store the cached data in a data block of the nonvolatile storage 24, and may set the stored data block as erasable state, which means state 1 S1.

Meanwhile, state 4 S4 corresponds to the case where a data block of state 1 S1 in the nonvolatile storage 24 has been erased by, for example, garbage collection (GC). Since the corresponding data block of the nonvolatile storage 24 has been erased and thus becomes absent, it is switched to nominal invalid state.

Accordingly, the integrated memory control unit 21 freezes, or sets the cache block of the nonvolatile buffer cache 22 as frozen state, and considers data stored in the frozen cache block to be authentic original so as to substitute the status as original of the erased data block.

Furthermore, after the cache block of state 4 S4 has been frozen until a commit operation is performed, the integrated memory control unit 21 performs a read operation on the frozen cache block when read access is made to the data, and stores write data for write access in another empty cache block using, for example, a copy-on-write technique.

In other words, if a cache block cached in the nonvolatile buffer cache 22 is a clean up-to-date cache block and a corresponding data block in the nonvolatile storage 24 has been erased and is thus absent, or if a cache block cached in the nonvolatile buffer cache 22 is a dirty up-to-date cache block committed at least once and thus the corresponding data block in the nonvolatile storage 24 is an out-of-date version, the integrated memory control unit 21 sets the corresponding data block of the nonvolatile storage 24 as invalid state.

Meanwhile, if write access is made to a frozen up-to-date cache block, the frozen dirty up-to-date cache block becomes a frozen dirty out-of-date cache, and a cache block newly written using a copy-on-write technique is managed as a normal (unfrozen) dirty up-to-date cache.

The frozen dirty up-to-date cache block of state 4 S4 acts as an authentic original until write access is made to the frozen up-to-date cache block, and also the frozen dirty out-of-date cache block of state 5 S5 acts as an authentic original after write access has been made, until a commit operation is performed on the frozen up-to-date cache block.

In other words, the cache block in state 4 S4 to which write access has been made is switched to state 5 S5, and a newly copy-on-written cache block is set as state 3' S3'.

In this case, the cache block in state 3' S3' is similar to the cache block of state 3 S3, in that no valid original data block corresponding to the cache block is present in the nonvolatile storage 24, and is different from the cache block of state 3 S3, in that a dirty up-to-date cache does not yet have a corresponding journal block, and thus a frozen dirty out-of-date cache block acts as an authentic original, instead of absent journal block.

At a commit operation, the integrated memory control unit 21 switches the frozen dirty out-of-date cache block of state 5 S5 to a frozen dirty obsolete cache block (state 6 S6), and switches a normal dirty up-to-date cache block (state 3' S3') to a committed normal dirty up-to-date cache block (state 3 S3) by committing the normal dirty up-to-date cache block, with no corresponding journal block then, to a new journal block of the nonvolatile journaling region 23.

Since the up-to-date data has been committed to the journal block of the nonvolatile journaling region 23, data stored in the journal block of the nonvolatile journaling region 23 is considered to be authentic original.

Furthermore, as described above, if a checkpoint operation is performed later, the integrated memory control unit 21 stores data of the journal block of state 3 S3 in the nonvolatile journal area 23 into the nonvolatile storage 24, sets the storing data block as erasable state of state 1 S1, and reconfigures the journaled normal dirty up-to-date cache block of state 3 S3 as a not-yet-journaled normal clean up-to-date cache block of state 1 S1.

Meanwhile, upon performing a checkpoint operation, the integrated memory control unit 21 may empty the frozen dirty out-of-date cache block of state 5 S5 or the frozen dirty obsolete cache block of state 6 S6, and may clear those cache blocks into empty cache blocks of state 0 S0.

Since a frozen dirty obsolete cache block does not substantially act only as an original but also as a cache block and just occupies capacity, it may be cleared into an empty cache block at any time, for example, immediately, at an arbitrary point in time, or upon performing a checkpoint operation.

Figure 3:
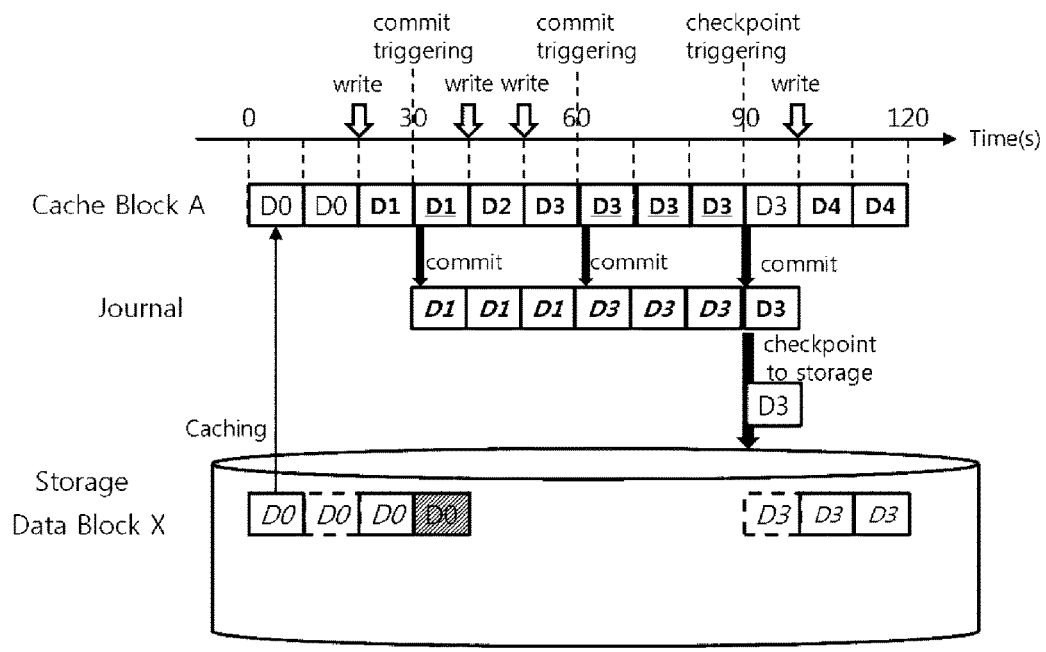
FIG. 3 a conceptual diagram illustrating operations performed after data stored in a nonvolatile storage has been cached in a nonvolatile buffer cache in accordance with a method of integrated data management for a nonvolatile buffer cache and a nonvolatile storage according to an embodiment of the present invention.
Figure 4:
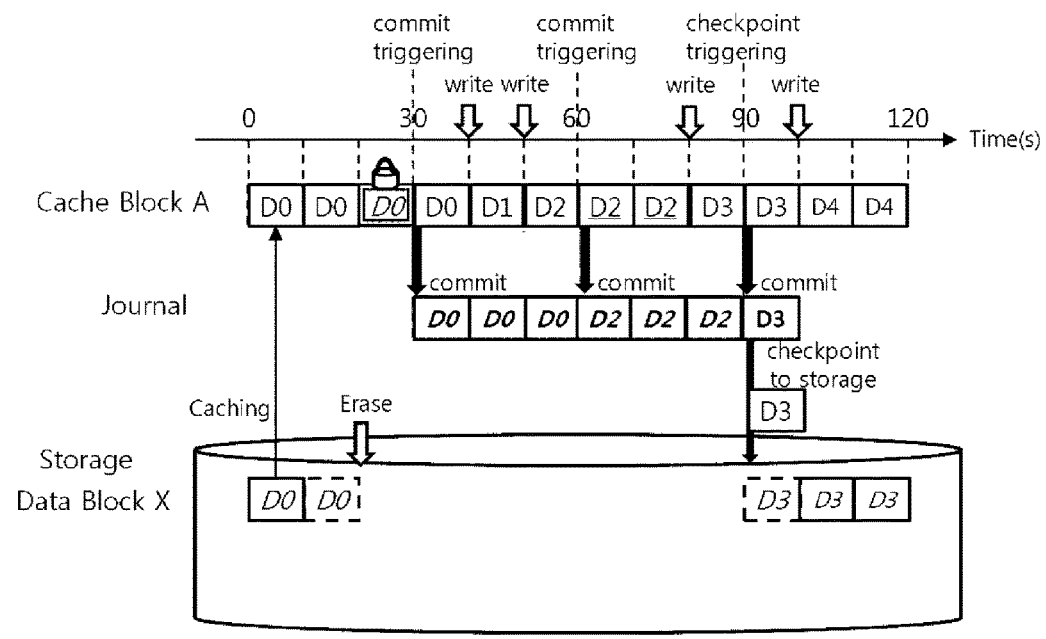
FIG. 4 is a conceptual diagram illustrating different operations performed after data stored in a nonvolatile storage has been cached in a nonvolatile buffer cache in accordance with a method of integrated data management for a nonvolatile buffer cache and a nonvolatile storage according to an embodiment of the present invention.
Figure 5:
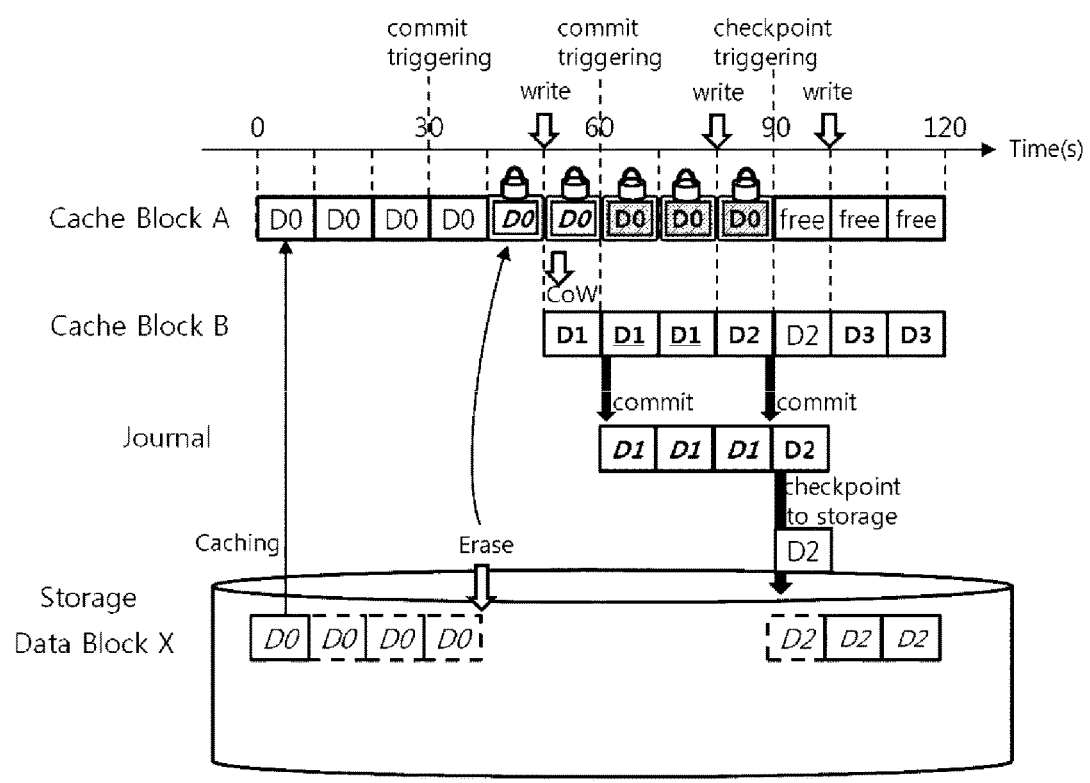
FIG. 5 is a conceptual diagram illustrating different operations performed in the case where data stored in a nonvolatile storage is cached in a nonvolatile buffer cache and then garbage collection is actually performed, in accordance with a method of integrated data management for a nonvolatile buffer cache and a nonvolatile storage according to an embodiment of the present invention.

FIGS. 3, 4 and 5 are conceptual diagrams illustrating operations performed after data stored in a nonvolatile storage has been cached in a nonvolatile buffer cache in accordance with a method of integrated data management for a nonvolatile buffer cache and a nonvolatile storage according to an embodiment of the present invention.

In FIGS. 3, 4 and 5, symbols in italic notation (e.g., D0) denote versions that are considered to be authentic original at corresponding points in time, symbols in normal gothic notation (e.g., D0) denote clean caches, symbols in bold gothic notation denote dirty caches, and underlined symbols denote caches having corresponding journals.

In the nonvolatile storage, solid line boxes denote blocks storing valid data, broken line boxes denote blocks in erasable state S1, and hatched boxes denote data blocks set as invalid state.

A series of operations shown in FIG. 3 illustrate the case where, after data have been cached, a checkpoint operation is performed before a storage data block in erasable state will be actually erased.

Referring to FIG. 3, at time t=0, data D0 stored in a data block X of the nonvolatile storage 24 is cached in a cache block A of the nonvolatile buffer cache 22 by read access.

Although the original version of the data is the data D0 of the data block X of the nonvolatile storage 24 at first, the nonvolatile buffer cache 22 has become a clean cache having the data D0 with the read access, and thus, at t=10, the data D0 of the data block X of the nonvolatile storage 24 has entered erasable state S1 indicated by a broken line, that is, a state in which the data is valid but erasable at any time.

At t=20, an update write is performed on data D0, and thus the cached data of a cache block A is changed into D1 and becomes a dirty cache. Although the data has been changed, the change has not been finalized by a commit operation and the data D0 of the data block X of the nonvolatile storage 24 has not been erased yet, and thus the data block X of the storage is set as valid state (state 2 S2) as before and the data D0 of the storage keeps the position of an authentic original.

At t=30, a commit operation is performed, and data D1 updated in a cache block is committed to a journal block of the journal area, and then the data D1 written to the journal block is considered as authentic original (state 3 S3). Read and write access can be made to the cache block A, and the data block X of the storage is now invalid and may be provided for the storage of other data.

At t=40 and t=50, write accesses are successively made, and thus data D2 and D3 are successively updated in the cache block A. In this case, since a subsequent commit operation has not yet been performed, the journal area remains unchanged, and data D1 stored in the journal block of the journal area is still considered to be authentic original (state 3 S3).

At t=60, another commit operation is executed, so that data D3 updated in the cache block is committed to a journal block of a journal area and the data D3 committed to the journal area is considered to be authentic original (state 3 S3). Read and write access may be still made to the cache block A.

At t=70 and t=80, no operation is performed, and thus state 3 S3 maintains. At t=90, a checkpoint operation is eventually performed, and the data D3 stored in the journal area is stored (i.e. checkpointed) in the storage. The cache block A having the data D3 becomes an up-to-date clean cache (state 1 S1), and the data block X of the storage having the data D3 checkpointed in the storage enters erasable state S1.

At t=100, a write operation is performed again, and thus an update write operation is performed on the data D3, so that the cached data of the cache block A is changed into D4. Since the data has been changed but this change has not been finalized by a commit operation, the data block X of the storage is set as valid state (state 2 S2) again, and thus the data D3 of the data block X is considered to be authentic original.

FIG. 4 is a conceptual diagram illustrating another operation that is performed after data stored in a nonvolatile storage has been cached in a nonvolatile buffer cache in accordance with a method of integrated data management for a nonvolatile buffer cache and a nonvolatile storage according to an embodiment of the present invention.

A series of operations shown in FIG. 4 illustrates the case where data is cached, a storage data block having entered an erasable state is actually erased and then a checkpoint operation is performed.

Referring to FIG. 4, at time t=0, data D0 stored in a data block X of the nonvolatile storage 24 is cached in a cache block A of the nonvolatile buffer cache 22 by read access.

The nonvolatile buffer cache 22 has become a clean cache having the data D0 with the read access, and thus, at t=10, the data D0 of the data block X of the nonvolatile storage 24 has entered into erasable state S1 indicated by a broken line.

Unlike in the case of FIG. 3, a data block C in an erasable state is actually erased by garbage collection or the like, at t=20. The cache block A, which is a normal clean cache having the data D0, is immediately changed into a frozen dirty up-to-date cache block (state 4 S4), and the data D0 stored in the frozen dirty up-to-date cache block, instead of the erased data block X, is considered to be authentic original (state 4 S4). A write operation is prohibited from being performed on the cache block A, but read access may be allowed to the cache block A.

At t=30, a commit operation is performed, and thus the data D0 cached in the frozen cache block is committed to a journal block of the journal area. The frozen cache block A is released from freezing, and thus is changed into a normal dirty up-to-date cache block. The data D0 stored in the journal area is considered to be authentic original (state 3 S3).

At t=40 and t=50, write accesses are successively made, and thus data D1 and D2 are successively updated in the cache block A. In this case, since a subsequent commit operation has not yet been performed, the journal area remains having the data D0, and the data D0 of the journal area is considered to be authentic original (state 3 S3).

At t=60, a commit operation is performed, so that data D2 updated in the cache block A is committed to a journal block of a journal area and the data D2 recorded in the journal area is considered to be authentic original (state 3 S3).

At t=70, no operation is performed, and thus state 3 S3 maintains. At t=80, a write operation is performed and thus the cache block A is updated into D3. In this case, a commit operation has not yet been performed, and thus the older version of data D2 in the journal area functions as an authentic original.

At t=90, a checkpoint operation is eventually performed, and the data D3, which is the more up-to-date data between the data D2 of the journal area and the data D3 of the cache block A, is stored in the storage. More specifically, the data D3 in the cache block A, updated after the commit operation has been performed at t=60, replaces the data D2 of the journal area at t=90, and the replacing data D3 of the journal area is recorded in the data block of the storage.

Once the checkpoint operation has been completed, the cache block A becomes an up-to-date clean cache (state 1 S1), and the data block of the storage having the data D3 checkpointed in the storage enters erasable state S1.

At t=100, a write operation is performed again, and thus an update write operation is performed on the data D3, so that the cached data of the cache block A is changed into D4. Since the data has been changed but this change has not been finalized by a commit operation, the data block of the storage is set as valid state (state 2 S2) again, and thus the data D3 of the data block X is considered to be authentic original.

FIG. 5 is a conceptual diagram illustrating another operation that is performed in the case where data stored in a nonvolatile storage is cached in a nonvolatile buffer cache and then garbage collection is actually performed, in accordance with a method of integrated data management for a nonvolatile buffer cache and a nonvolatile storage according to an embodiment of the present invention.

A series of operations shown in FIG. 5 illustrates the case where data is cached, a storage data block having entered an erasable state is actually erased, an update write operation is attempted to be performed on a frozen cache and then a checkpoint operation is performed.

Referring to FIG. 5, at time t=0, data D0 stored in a data block X of the nonvolatile storage 24 is cached in a cache block A of the nonvolatile buffer cache 22 by read access.

The nonvolatile buffer cache 22 has become a clean cache having the data D0 alongside the read access, and thus, at t=10, the data D0 of the data block X of the nonvolatile storage 24 has entered erasable state S1 indicated by a broken line.

Unlike FIG. 4 illustrating the case where the cache block A of state 4 S4 is updated after a commit operation, FIG. 5 illustrates the case where the cache block A of state 4 S4 is updated before being committed.

During a period from t=10 to t=40, no update write operation is performed on the cache block A, and the data block X remains intact, so that the erasable state S1 maintains.

At t=40, erasing is actually performed by garbage collection, or the like. The cache block A having the data D0 is immediately changed into a frozen dirty up-to-date cache block (state 4 S4), and the data D0 stored in the frozen dirty up-to-date cache block, instead of the erased data block X, is considered to be authentic original (state 4 S4). A write operation is prohibited from being performed on the cache block A, but read access may be allowed to the cache block A.

At t=50, a write operation is performed, in which case data D1 is stored in a new cache block B using a copy-on-write (CoW) technique (state 3' S3') because the cache block A has been frozen. Although the cache block A is set as a frozen dirty out-of-date cache block (state 5 S5), a commit operation has not been performed yet, and the data D0 of the cache block A is still considered to be authentic original.

At t=60, a commit operation is performed, so that the data D1 cached in the dirty up-to-date cache block B is committed to a journal block of a journal area and the data D1 recorded in the journal area is considered to be authentic original (state 3 S3). The cache block A is changed into a frozen dirty obsolete cache block (state 6 S6).

Although the cache block A may be immediately cleared into an empty cache block because the cache block A has completely obsolete cache data, this operation may be performed along with a checkpoint operation, as in the conventional technology, because the operation itself may demand additional overhead.

At t=70, with no operation, the state 3 S3 of the cache block B and the state 6 S6 of the cache block A maintains. At t=80, a write operation is performed and thus the cache block B is updated into D2. In this case, a commit operation has not been performed, and thus the older version of data D1 in the journal area functions as an original.

At t=90, a checkpoint operation is eventually performed, and the data D2, which is the more up-to-date between the data D1 of the journal area and the data D2 of the cache block B, is stored in the storage. More specifically, the data D2 in the cache block B updated after the commit operation at t=60, replaces the data D1 of the journal area, at t=90, and simultaneously the replacing data D2 of the journal area is recorded in the data block of the storage.

Once the checkpoint operation has been completed, the cache block A having obsolete data D0 may be emptied alongside the checkpoint (state 0 S0), and the cache block B becomes an up-to-date clean cache (state 1 S1). The data block of the storage having the data D2 checkpointed in the storage becomes authentic original and erasable state S1.

At t=100, a write operation is performed again, and thus an update write operation is performed on the data D2, so that the cached data of the cache block B is changed into D3. Since the data has been changed but this change has not been finalized by a commit operation, the data block of the storage is set as valid state (state 2 S2) again, and thus the data D2 of the data block X is considered to be authentic original.

Figure 6:
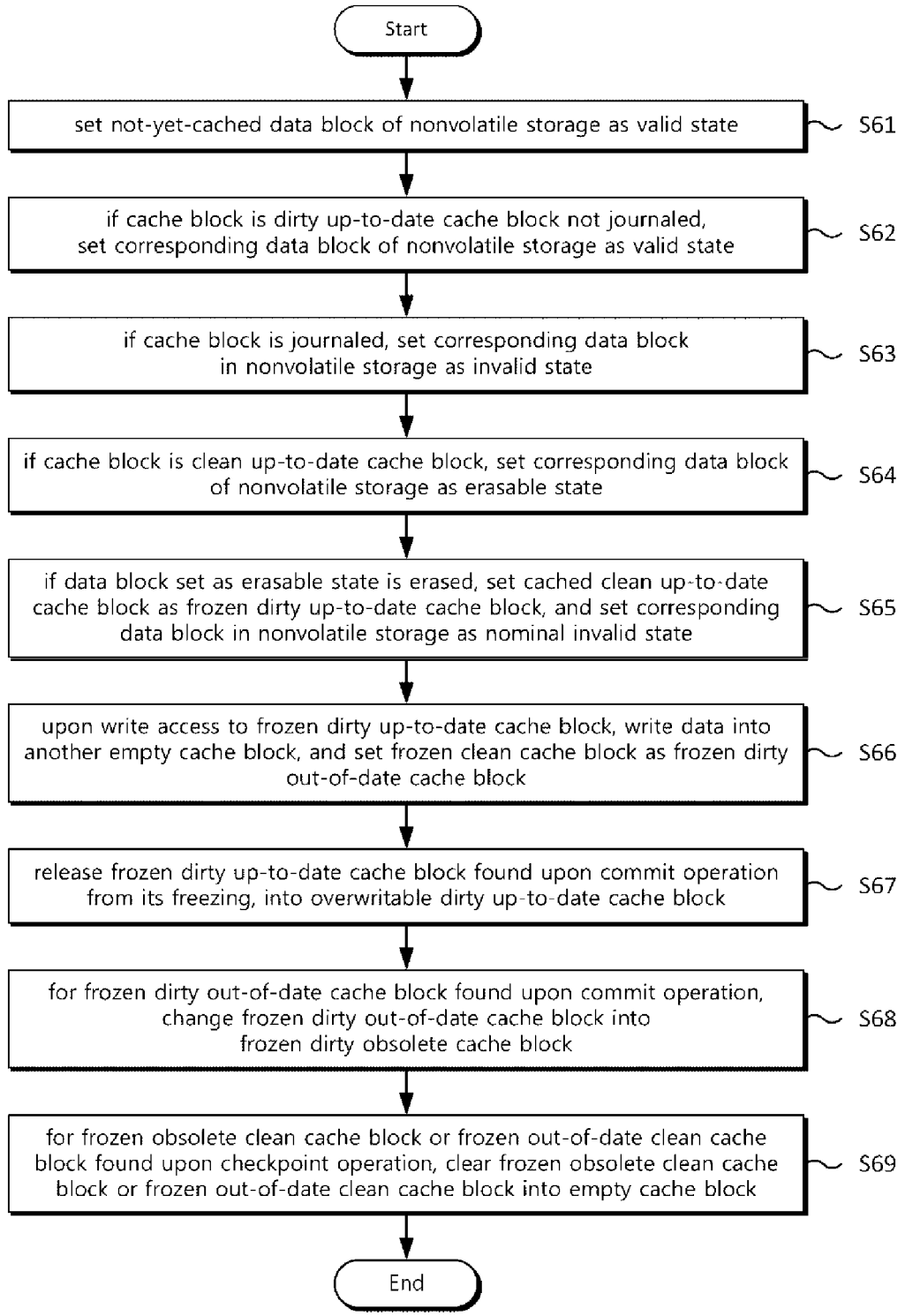
FIG. 6 is a flowchart of a method of integrated data management for a nonvolatile buffer cache and a nonvolatile storage according to an embodiment of the present invention.

FIG. 6 is a flowchart of a method of integrated data management for a nonvolatile buffer cache and a nonvolatile storage according to an embodiment of the present invention.

Referring to FIG. 6, at step S61 in the integrated data management method, the integrated memory control unit 21, configured to manage a nonvolatile buffer cache and a nonvolatile storage in an integrated manner, sets a not-yet-cached data block of the nonvolatile storage 24 as valid state.

Thereafter, at step S62, when read or write access is made to a data block of the nonvolatile storage 24 and thus data is cached in the nonvolatile buffer cache 22, if a cache block being cached in the nonvolatile buffer cache 22 is a dirty up-to-date cache block not yet committed to the nonvolatile journal area 23, a corresponding data block in the nonvolatile storage 24 is set as valid state. Step S62 is based on the assumption that a corresponding data block is present in the nonvolatile storage 24.

Meanwhile, if read access or write access is made to a dirty up-to-date cache block that has not yet been committed after being cached, a corresponding read or write operation is performed on the corresponding dirty up-to-date cache block.

At step S63, if a cache block having been cached and not yet been committed in the nonvolatile buffer cache 22 is committed to the nonvolatile journal area, a corresponding data block in the nonvolatile storage 24 is set as invalid state. The data of a journal block committed to the nonvolatile journal area 23, instead of the data of the data block in the nonvolatile storage 24 set as invalid state, is considered to be authentic original.

At step S64, if a cache block cached in the nonvolatile buffer cache 22 is a clean up-to-date cache block, a corresponding data block of the nonvolatile storage 24 is set as erasable state.

More specifically, if a new data block is cached from the nonvolatile storage 22 in response to read access, or if a checkpoint operation is performed on a dirty up-to-date cache block and thus a data block having up-to-date data is created in the nonvolatile storage 24, the corresponding cache block is referred to as a clean up-to-date cache block having cached data identical to data of the data block.

At step S65, if a data block set as erasable state is erased, the clean up-to-date cache block is set as a frozen dirty up-to-date cache block, and the erased data block in the nonvolatile storage 24 is set nominally as invalid state.

Accordingly, the data of data blocks set as valid states S0 and S2 and erasable state S1 in the nonvolatile storage 24 are respectively considered to be authentic original. Furthermore, if there is no corresponding valid data block in the nonvolatile storage 24, data stored in a frozen dirty cache block (including a frozen dirty up-to-date cache block S4 and a frozen dirty out-of-date cache block S5) in the nonvolatile buffer cache 22, or data committed to the journal block S3 of the nonvolatile journal area 23 with respect to a unfrozen dirty up-to-date cache block over which data can be written, instead of the invalid data of the invalid data block of the nonvolatile storage 24, may be considered to be authentic original.

Furthermore, at step S66, if write access is made to a frozen dirty up-to-date cache block, data related to the write access is written into another empty cache block using a copy-on-write (CoW) technique, and the frozen clean cache block is turned into a frozen dirty out-of-date cache block.

Furthermore, at step S67, any frozen dirty up-to-date cache block, found upon performing a commit operation, is released from freezing, and thus is turned into an overwritable dirty up-to-date cache block.

Furthermore, at step S68, any frozen dirty out-of-date cache block, found upon performing a commit operation, is turned into a frozen dirty obsolete cache block.

Moreover, at step S69, any frozen obsolete clean cache block or any frozen out-of-date clean cache block at a predetermined time, for example, found upon performing a checkpoint operation, is cleared into an empty cache block.

Meanwhile, the apparatus and method according to the present invention may be implemented in the form of computer-readable code stored on a computer-readable storage medium. The computer-readable storage medium includes all types of storage devices that store computer-readable data. Examples of the computer-readable storage medium include ROM, RAM, an optical disk, magnetic tape, a hard disk, non-volatile memory, etc, and also include carrier waves (for example, in the case of transmission over the Internet). Furthermore, the computer-readable storage medium may be distributed throughout a computer system connected over a network and also the computer-readable code may be stored and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated nonvolatile memory control subsystem, comprising:
a nonvolatile buffer cache configured to maintain one or more cache blocks;
a nonvolatile journal area configured to maintain one or more journal blocks;
nonvolatile storage configured to maintain one or more data blocks; and
an integrated memory control unit for performing a read operation, a write operation, a commit operation and a checkpoint operation on the cache blocks of the nonvolatile buffer cache and the journal blocks of the nonvolatile journal area,
wherein the integrated memory control unit sets each of data blocks of the nonvolatile storage as one among valid state, erasable state and invalid state, depending on being cached or not, being journaled or not, and being a clean cache or not, considers data stored in a data block of the nonvolatile storage to be authentic original if the data block is of valid state or erasable state, and considers data stored in any one of cache block and journal block to be authentic original if a corresponding data block of the nonvolatile storage is of invalid state, so as to maintain an authentic original up-to-date consistent data within any one of the nonvolatile buffer cache, the nonvolatile journal area and the nonvolatile storage.

2. The integrated nonvolatile memory control subsystem of claim 1, wherein the integrated memory control unit is operative to set a data block as valid state, the data block being corresponding to data previously being cached from the nonvolatile storage to the nonvolatile buffer cache and then being evicted from the nonvolatile buffer cache, a data block being not yet cached, and a data block of the nonvolatile storage corresponding to a dirty up-to-date cache block not yet committed to the nonvolatile journal area after being cached.

3. The integrated nonvolatile memory control subsystem of claim 2, wherein the integrated memory control unit is operative to set a corresponding data block of the nonvolatile storage as invalid state and to consider data stored in a journal block of the nonvolatile journal area in response to a commit operation to be authentic original, if a dirty up-to-date cache block not yet committed to the nonvolatile journal area is committed to the nonvolatile journal area by the commit operation.

4. The integrated nonvolatile memory control subsystem of claim 1, wherein the integrated memory control unit is operative to set a cache block satisfying conditions as a clean up-to-date cache block, the conditions including a condition in which a corresponding data block of the nonvolatile storage has been cached in the nonvolatile buffer cache in response to read access, or a condition in which up-to-date data is stored in a corresponding data block of the nonvolatile storage in response to a checkpoint operation performed on a dirty up-to-date cache block in the nonvolatile buffer cache, and to set a data block of the nonvolatile storage corresponding as a clean up-to-date cache block of the nonvolatile buffer cache as erasable state.

5. The integrated nonvolatile memory control subsystem of claim 4, wherein the integrated memory control unit is operative to receive a report related to monitoring whether a data block set as erasable state in the nonvolatile storage is actually erased or a report on erasing a data block of erasable state from the nonvolatile storage.

6. The integrated nonvolatile memory control subsystem of claim 4, wherein the integrated memory control unit is operative to:
set a clean up-to-date cache block being cached in the nonvolatile buffer cache corresponding as an erased data block, as a frozen dirty up-to-date cache block, if the erased data block is a data block, having been set as erasable state and having been considered to be authentic original in the nonvolatile storage, before being actually erased; and
consider data stored in the frozen dirty up-to-date cache block in the nonvolatile buffer cache to be authentic original until a subsequent commit or checkpoint operation is performed.

7. The integrated nonvolatile memory control subsystem of claim 6, wherein the integrated memory control unit is operative to:
release a frozen dirty up-to-date cache block from its frozen state in the nonvolatile buffer cache and thus change the frozen dirty up-to-date cache block to a dirty up-to-date cache block if the frozen dirty up-to-date cache block in the nonvolatile buffer cache is committed to the nonvolatile journal area in response to a commit operation; and
consider data stored in an journal block of the nonvolatile journal area according to the commit operation to be authentic original.

8. The integrated nonvolatile memory control subsystem of claim 7, wherein the integrated memory control unit is operative to:
upon performing a checkpoint operation, store data, which was stored in a journal block of the nonvolatile journal area and considered to be authentic original, in a data block of the nonvolatile storage; and
set the data stored in the nonvolatile storage as erasable state.

9. The integrated nonvolatile memory control subsystem of claim 6, wherein the integrated memory control unit is operative to:
as for write access to a frozen dirty up-to-date cache block of the nonvolatile buffer cache, write data related to the write access into an empty cache block;
set the frozen dirty up-to-date cache block as a frozen dirty out-of-date cache block; and
consider the data stored in the frozen dirty out-of-date cache block of the nonvolatile buffer cache to be authentic original until a subsequent commit or checkpoint operation is performed.

10. The integrated nonvolatile memory control subsystem of claim 9, wherein the integrated memory control unit is operative to clear the frozen dirty out-of-date cache block or a frozen dirty obsolete cache block, which has been turned into from the frozen dirty out-of-date cache block in response to a commit operation, into an empty cache block.

11. An information processing apparatus, comprising:
a processor; and
an integrated nonvolatile memory control subsystem,
wherein the integrated nonvolatile memory control subsystem comprises:
a nonvolatile buffer cache configured to maintain one or more cache blocks;
a nonvolatile journal area configured to maintain one or more journal blocks;
nonvolatile storage configured to maintain one or more data blocks; and an integrated memory control unit for performing a read operation, a write operation, a commit operation and a checkpoint operation on the cache blocks of the nonvolatile buffer cache and the journal blocks of the nonvolatile journal area, wherein the integrated memory control unit sets each of data blocks of the nonvolatile storage as one among valid state, erasable state and invalid state, depending on being cached or not, being journaled or not, and being a clean cache or not, considers data stored in a data block of the nonvolatile storage to be authentic original if the data block is of valid state or erasable state, and considers data stored in any one of cache block and journal block to be authentic original if a corresponding data block of the nonvolatile storage is of invalid state, so as to maintain an authentic original up-to-date consistent data within any one of the nonvolatile buffer cache, the nonvolatile journal area and the nonvolatile storage.

12. An integrated nonvolatile memory control method for a host managing a nonvolatile buffer cache configured to maintain one or more cache blocks, a nonvolatile journal area configured to maintain one or more journal blocks, and nonvolatile storage configured to maintain one or more data blocks in an integrated manner, the method comprising:

by the host, setting, as valid state, a data block corresponding to data being cached from the nonvolatile storage to the nonvolatile buffer cache and then being evicted for emptying the cache block, or a data block being not yet cached;

setting a corresponding data block in the nonvolatile storage as valid state if a cache block cached in the nonvolatile buffer cache is a dirty up-to-date cache block, not yet committed to the nonvolatile journal area;

setting a corresponding data block in the nonvolatile storage as invalid state if a cache block having been cached but not yet been committed to the nonvolatile buffer cache was committed to the nonvolatile journal area;

setting a corresponding data block in the nonvolatile storage as erasable state if a cache block cached in the nonvolatile buffer cache is a clean up-to-date cache block; and setting, if a data block set as erasable state was actually erased, a clean up-to-date cache block corresponding to the erased data block as a frozen dirty up-to-date cache block and setting the erased data block in the nonvolatile storage as nominal invalid state.

13. The integrated nonvolatile memory control method of claim 12, wherein if a dirty up-to-date cache block not yet committed to the nonvolatile journal area was committed to the nonvolatile journal area by a commit operation, the data stored in a journal block of the nonvolatile journal area in response to the commit operation is considered to be authentic original.

14. The integrated nonvolatile memory control method of claim 12, wherein a cache block satisfying conditions is set as a clean up-to-date cache block, wherein the conditions including a condition in which a corresponding data block of the nonvolatile storage has been cached in the nonvolatile buffer cache in response to read access, or a condition in which up-to-date data is stored in a corresponding data block of the nonvolatile storage in response to a checkpoint operation performed on a dirty up-to-date cache block in the nonvolatile buffer cache.

15. The integrated nonvolatile memory control method of claim 12, further comprising:

receiving a report related to monitoring whether a data block set as erasable state in the nonvolatile storage is actually erased, or a report on erasing a data block of erasable state from the nonvolatile storage.

16. The integrated nonvolatile memory control method of claim 12, wherein data stored in the frozen dirty up-to-date cache block in the nonvolatile buffer cache is considered to be authentic original until a subsequent commit or checkpoint operation is performed.

17. The integrated nonvolatile memory control method of claim 12, further comprising:

releasing a frozen dirty up-to-date cache block from its frozen state in the nonvolatile buffer cache and thus change the frozen dirty up-to-date cache block to a dirty up-to-date cache block if the frozen dirty up-to-date cache block in the nonvolatile buffer cache is committed to the nonvolatile journal area in response to a commit operation, wherein the data stored in an journal block of the nonvolatile journal area according to the commit operation is considered to be authentic original.

18. The integrated nonvolatile memory control method of claim 17, wherein, upon performing a checkpoint operation, data, which was stored in a journal block of the nonvolatile journal area and considered to be authentic original, is stored in a data block of the nonvolatile storage and the data stored in the nonvolatile storage is set as erasable state.

19. The integrated nonvolatile memory control method of claim 12, further comprising:

as for write access to a frozen dirty up-to-date cache block of the nonvolatile buffer cache, writing data related to the write access into an empty cache block; and setting the frozen dirty up-to-date cache block as a frozen dirty out-of-date cache block, wherein the data stored in the frozen dirty out-of-date cache block of the nonvolatile buffer cache is considered to be authentic original until a subsequent commit or checkpoint operation is performed.

20. The integrated nonvolatile memory control method of claim 19, further comprising:

clearing the frozen dirty out-of-date cache block or a frozen dirty obsolete cache block, which has been turned into from the frozen dirty out-of-date cache block in response to a commit operation, into an empty cache block.

* * * * *